United States Patent
Chen et al.

(10) Patent No.: US 7,245,113 B2
(45) Date of Patent: Jul. 17, 2007

(54) HIGH LIGHT LOAD EFFICIENCY SYNCHRONOUS BUCK REGULATOR WITH PULSE SKIPPING CONTROL

(75) Inventors: Jason Chen, Plano, TX (US); Jinrong Qian, Plano, TX (US); Sisan Shen, Plano, TX (US)

(73) Assignee: Intersil Corporation, Palm Bay, FL (US)

( * ) Notice: Subject to any disclaimer, the term of this patent is extended or adjusted under 35 U.S.C. 154(b) by 111 days.

(21) Appl. No.: 10/851,808

(22) Filed: May 21, 2004

(65) Prior Publication Data

US 2005/0258814 A1 Nov. 24, 2005

(51) Int. Cl.
*G05F 1/59* (2006.01)
(52) U.S. Cl. .................. 323/271; 323/284; 323/285
(58) Field of Classification Search ................ 323/271, 323/282, 283, 284, 285
See application file for complete search history.

(56) References Cited

U.S. PATENT DOCUMENTS

| | | | |
|---|---|---|---|
| 5,532,577 A * | 7/1996 | Doluca ..................... 323/282 |
| 5,745,352 A | 4/1998 | Sandri et al. |
| 5,905,370 A | 5/1999 | Bryson |
| 5,943,227 A | 8/1999 | Bryson et al. |
| 6,100,675 A | 8/2000 | Sudo |
| 6,215,288 B1 * | 4/2001 | Ramsey et al. ............. 323/224 |
| 6,275,016 B1 | 8/2001 | Ivanov |
| 6,307,356 B1 * | 10/2001 | Dwelley ..................... 323/282 |
| 6,344,980 B1 | 2/2002 | Hwang et al. |
| 6,366,070 B1 | 4/2002 | Cooke et al. |
| 6,396,252 B1 | 5/2002 | Culpepper et al. |
| 6,456,050 B1 | 9/2002 | Agiman |
| 6,469,914 B1 | 10/2002 | Hwang et al. |
| 6,600,298 B2 * | 7/2003 | McDonald et al. ......... 323/271 |
| 6,657,875 B1 | 12/2003 | Zeng et al. |
| 6,707,281 B2 * | 3/2004 | Solivan ...................... 323/225 |
| 6,815,939 B2 * | 11/2004 | Umemoto et al. .......... 323/286 |
| 6,844,710 B2 * | 1/2005 | Lipcsei et al. ............. 323/284 |
| 6,940,189 B2 * | 9/2005 | Gizara ....................... 307/151 |
| 7,019,507 B1 * | 3/2006 | Dittmer et al. ............ 323/284 |

* cited by examiner

*Primary Examiner*—Jeffrey Sterrett
(74) *Attorney, Agent, or Firm*—Howison & Arnott, L.L.P.

(57) ABSTRACT

A voltage regulator includes a voltage source for providing an input voltage and circuitry for regulating the input voltage to provide an output voltage. The circuitry for regulating the input voltage includes at least a high side switch and a low side switch. A skip mode controller controls the high side switch and the low side switch in order to minimize conduction losses and switching losses within the voltage regulator.

13 Claims, 5 Drawing Sheets

HIGH LIGHT LOAD EFFICIENCY SYNCHRONOUS BUCK REGULATOR WITH PULSE SKIPPING CONTROL

TECHNICAL FIELD OF THE INVENTION

The present invention relates to voltage regulators, and more particularly, to system and method for improving switching losses within a voltage regulator.

BACKGROUND OF THE INVENTION

A buck regulator is a switching power supply including at least one series switching transistor that chops the input voltage and applies the pulses to an average inductive capacitive filter. The output voltage of a buck regulator is lower than the input voltage. Buck regulators are one type of pulse width modulated (PWM) converters which are switching power supplies using power semiconductor switches in the on and off switching states to provide a device with high efficiency, small size and light weight. Pulse width modulated converters employ square wave pulse width modulation to achieve voltage regulation. The output voltage of the PWM converter is varied by varying the duty cycle of the power semiconductor switches within the circuit. The voltage waveform across the switches at the output is square wave in nature and generally results in higher switching losses when the switching frequency is increased. Traditional synchronous buck converters suffer from low light load efficiencies due to the high switching losses and high conduction losses created by the circuit. While circuitries have been developed for controlling the high conduction losses within traditional synchronous buck converters, there has been no design that provides improvement for both switching and conduction losses and provides for smooth transitions between the discontinuous current mode and continuous current mode of operation of the converter. Circuitry operating in this fashion would minimize power losses and thus improve the longevity of the power supply's operation.

SUMMARY OF THE INVENTION

The present invention overcomes the foregoing and other problems with a voltage regulator including the voltage source for providing an input voltage. The voltage regulator further includes associated circuitry for regulating the input voltage to provide an output voltage. The associated circuitry includes at least a high side switch and a low side switch. A skip mode controller controls the high side switch and low switch to minimize the conduction losses and the switching losses within the voltage regulator.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
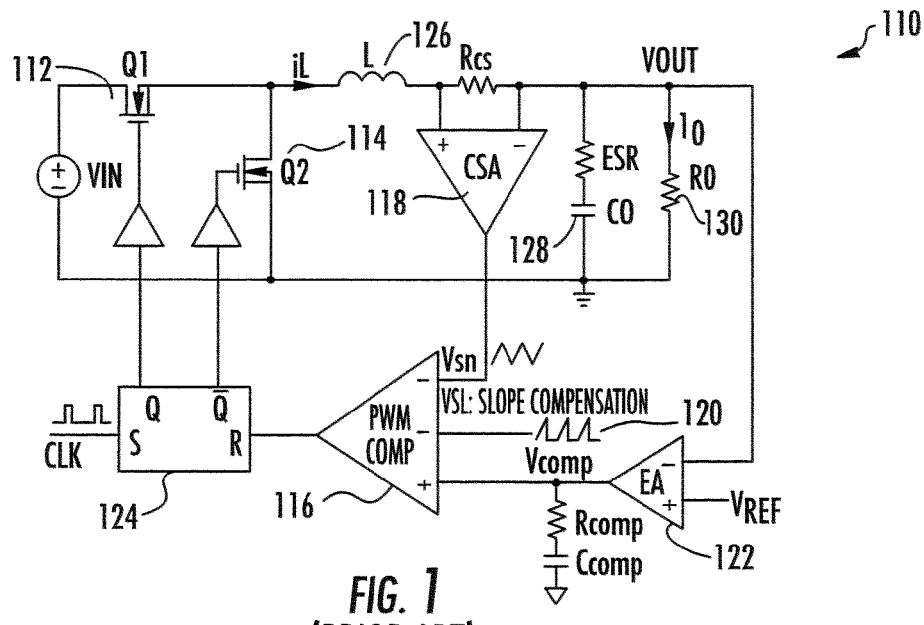
FIG. 1 is a schematic diagram of a synchronous buck regulator having traditional constant frequency peak current mode control.

Referring now to the drawings, and more particularly to FIG. 1, there is illustrated a synchronous buck generator 110 including traditional constant frequency peak current mode control. The high side switch 112 and low side switch 114 are controlled complementarily from the outputs of the RS flip flop 124. A PWM comparator 116 compares the integrated voltage feedback signal VCOMP which is applied to the positive input of the PWM comparator 116 with the sum of the amplified current-sense signal from the current-sense amplifier 118 and a slope compensation ramp signal 120. The output of the PWM comparator 116 is applied to RS flip-flop 124, at each rising clock edge, the high side switch 112, consisting of a MOSFET transistor, is turned on until the sum of the amplified current signal from the current signal amplifier 118 and the slope compensation signal 120 is greater than the integrated voltage feedback signal from the error amplifier 122. When this signal condition is reached, the output of PWM comparator 116 resets the RS flip-flop 124 and the RS flip-flop 124 turns off the high side switch 112.

Figure 2:
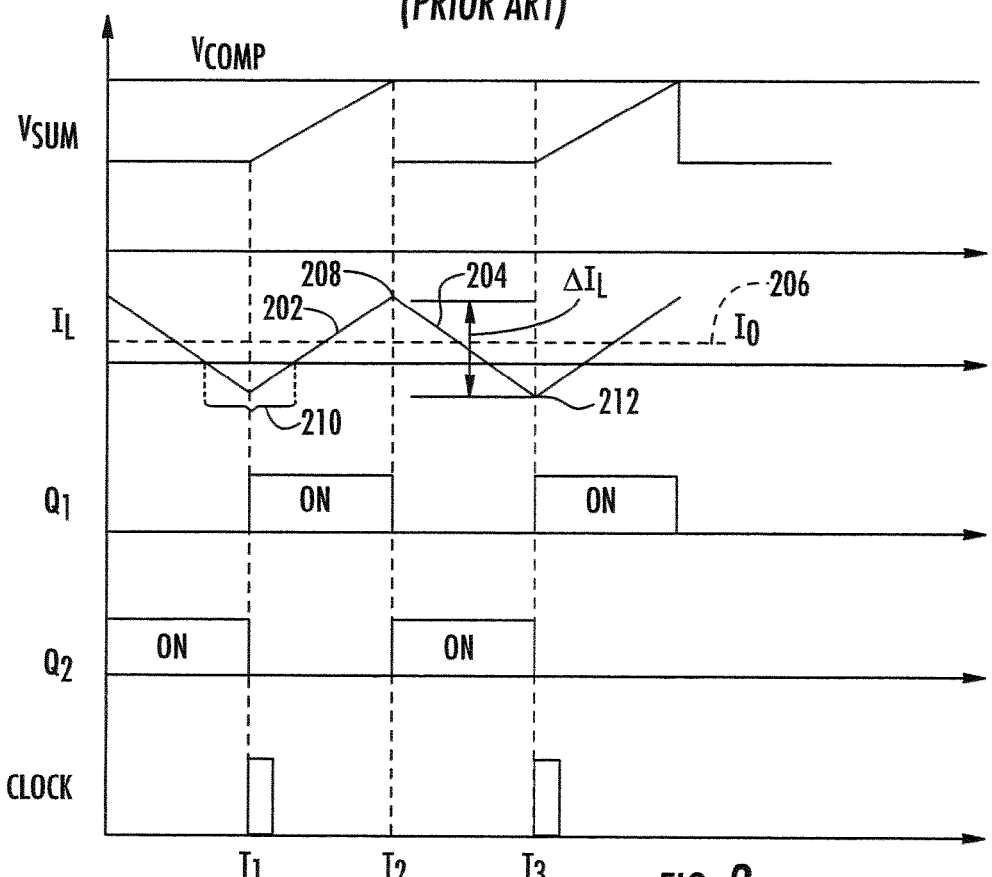
FIG. 2 is a timing diagram illustrating the operation of the circuit of FIG. 1.

Referring now also to FIG. 2, there is illustrated a timing diagram of the switching waveforms at light load in forced pulse width modulated (PWM) mode. While the high side transistor switch 112 is turned on, current $I_L$ ramps up through the inductor 126 sourcing the current to the output ($V_{OUT}$) and storing energy within the inductor 126. The current mode feedback system regulates the peak inductor current as a function of the output voltage error signal which is provided from the output of the error amplifier 122. To preserve loop stability, a compensation ramp signal 120 is summed with the amplified current-sense signal from the current-sense amplifier 118. When the high side switch 112 is turned off, the low side switch 114, consisting of a MOSFET transistor, is turned on. The inductor 126 releases its stored energy as the current ramps down (204) in the off condition while still providing current to the output $V_{OUT}$. The output capacitor 128 stores charge when the inductor 126 exceeds the load current. The output capacitor 128 releases this charge when the inductor current is lower and smooths the voltage across load 130.

If the load current (206) is less than half of the peak inductor current (208), the inductor current $I_L$ becomes negative in a certain amount of time interval (210) and circulates through the low side switch 114 resulting in high conduction losses. Switches 112 and 114 turn on and off complementarily with a fixed switching frequency responsive to the Q and $\overline{Q}$ outputs of the RS flip-flop 124. Thus, when the valley inductor current value (212) is reached, the low side switch 114 will turn off and the high side switch 112 will turn on as illustrated at $T_3$. Similarly, when the peak value (208) of the inductor current $I_L$ is reached, the high side switch 112 turns off and the low side switch 114 turns on as illustrated at $T_2$. The peak-to-peak inductor current ($\Delta I_L$) may be determined by the equation;

$$\Delta I_L = \frac{V_{IN} - V_{OUT}}{L} \cdot DT_S$$

Figure 3:
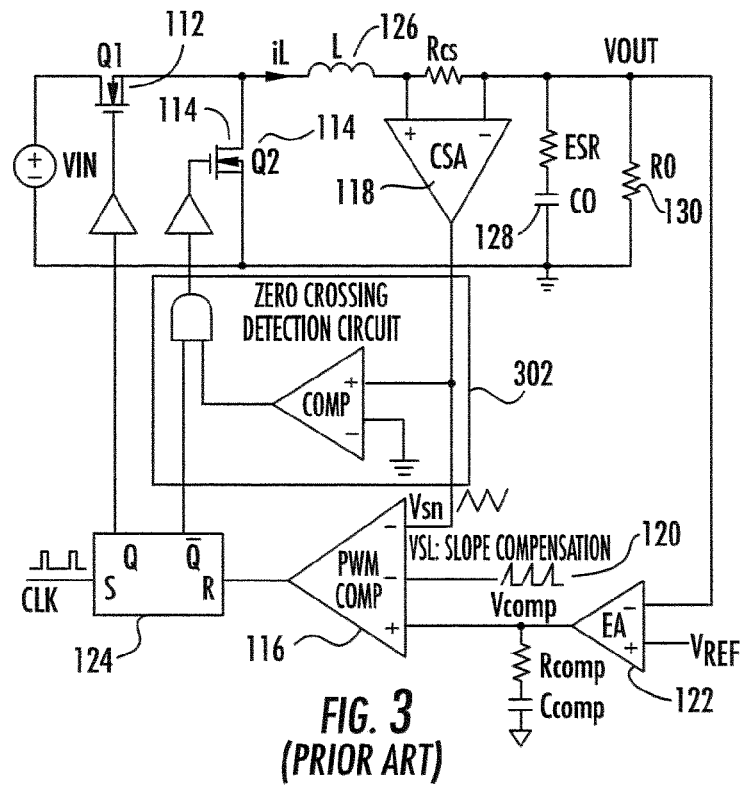
FIG. 3 is a schematic diagram of a synchronous buck regulator having zero crossing detection circuitry for limiting high conduction losses during light load operation.

Referring now to FIG. 3, there is illustrated one prior art method for reducing the conduction losses within a synchronous buck regulator at light loads. The circuitry described in FIG. 3 is the same as that described with respect to FIG. 1 with the inclusion of the zero crossing detection circuitry 302. The zero crossing detection circuitry 302 detects when the low side switch 114 current is below zero and turns off the low side switch 114 upon detection of this condition.

Figure 4:
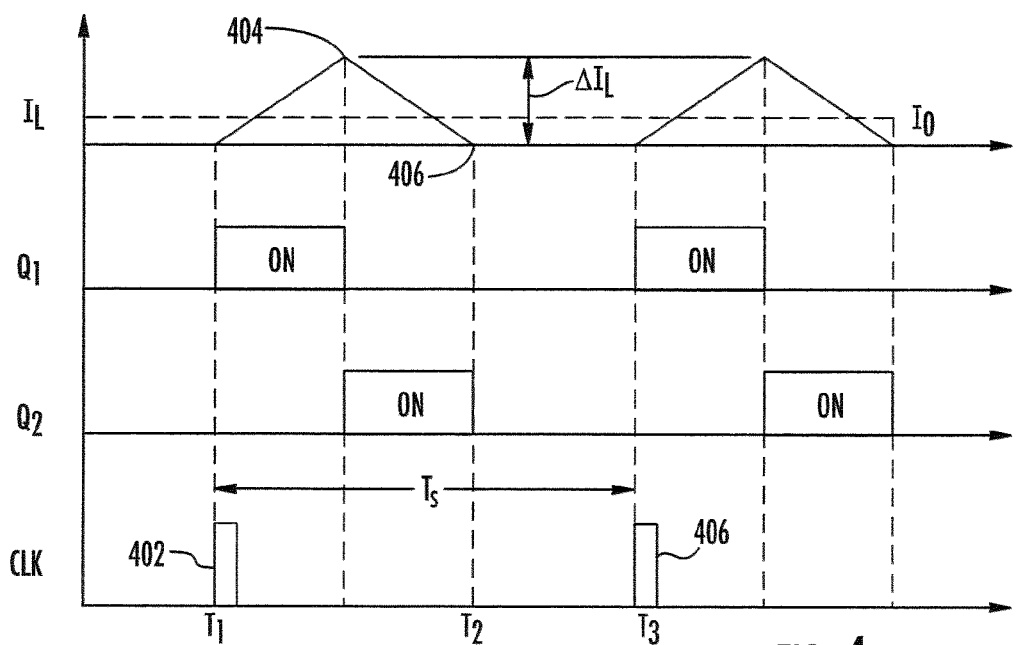
FIG. 4 is a timing diagram illustrating the operation of the circuitry of FIG. 3.

Referring now also to FIG. 4, there are illustrated the switching waveforms associated with the circuit of FIG. 3. The high side transistor 112 is turned on responsive to a clock pulse 402 at $T_1$. The high side switch 112 remains on until the inductor current ramps up to its peak value (404). Upon reaching the peak inductor current value (404), the high side transistor 112 turns off and the low side transistor 114 turns on. The low side transistor 114 will remain on until point $T_2$ wherein the low side transistor 114 is turned off. The low side transistor 114 is turned off by the zero detection circuit 302 once the inductor current through the low side switch 114 drops below zero (406). Both the high side switch 112 and the low side switch 114 remain off between points $T_2$ and $T_3$ until receipt of the next clock pulse 406. The process then repeats. There is no power loss while both switches 112 and 114 are turned off between $T_2$ and $T_3$. This results in lower conduction losses when compared with the regulator circuit described with respect to FIG. 1. The output voltage $V_0$ is regulated by the duty cycle while the converter keeps a constant high switching frequency operation not only during heavy load but at light loads. While a circuit of this type improves conduction losses, the circuit still suffers from high switching losses and low light load efficiency, since the circuit operates at the same frequency at both heavy loads and light loads.

Figure 5:
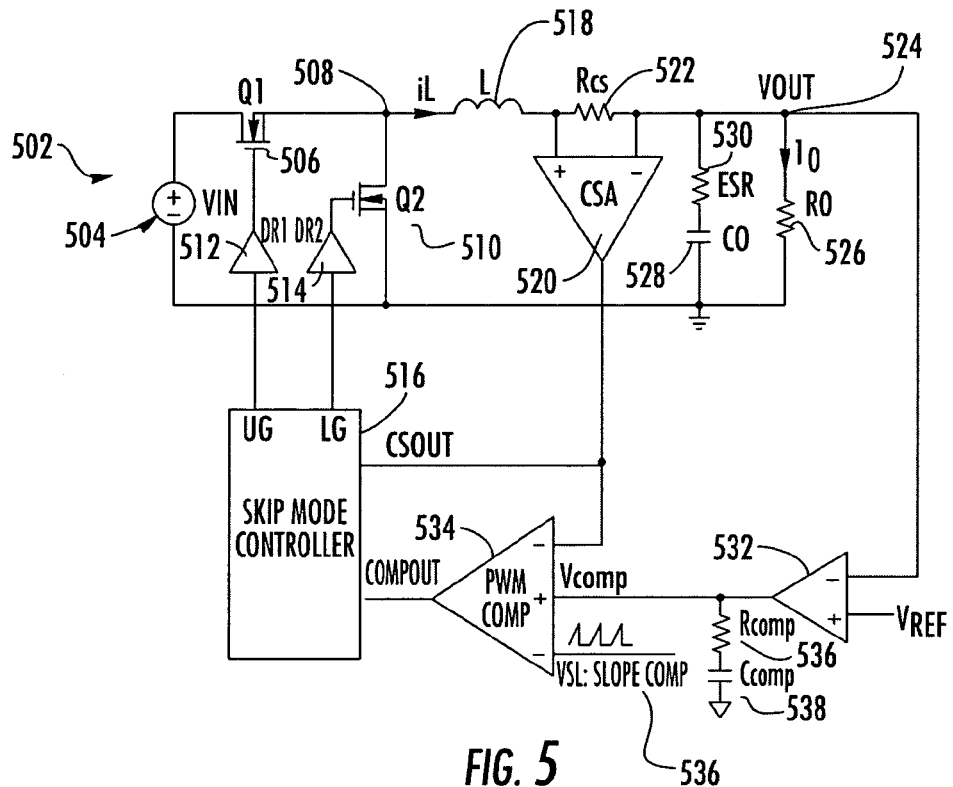
FIG. 5 is a schematic diagram of a synchronous buck regulator including a skip mode controller.

The shortcomings of the circuit described with respect to FIG. 3 are overcome in the high light load efficiency synchronous buck generator having pulse skipping control illustrated in FIG. 5. The buck regulator 502 includes a voltage source 504. High side switch 506 comprises a MOSFET transistor having its drain-source path between the voltage source 504 and node 508. The low side transistor also consists of a MOSFET transistor having its drain-source path connected between node 508 and ground. Each of the high side switch 506 and low side switch 510 have a driver 512, 514 connected to their gates and to the UG and LG outputs of the skip mode controller 516.

An inductor 518 is connected between node 508 and the positive input of current-sense amplifier 520. A resistor 522 is placed across the positive and negative inputs of the current-sense amplifier 520. The negative input of the current-sense amplifier 120 is connected to the voltage output node 524. A load resistor 526 is connected in parallel with a load capacitor 528 between voltage output node 524 and ground. Resistor 530 represents a parasitic resistance associated with capacitor 528.

An integrated voltage signal VCOMP is provided by an error amplifier 532 having its negative input connected to the voltage output node 524 and its positive input connected to a reference voltage $V_{REF}$. The output of the error amplifier 532 is connected to the positive input of a PWM comparator 534 and to ground through a resistor 536 and capacitor 538. The PWM comparator 534 compares the VCOMP signal from the error amplifier 532 with the sum of the amplified current-sense signal (CSOUT) from the current signal amplifier 520 and a slope compensation signal 536. The CSOUT signal is also provided as an input to the skip mode controller 516. The output (COMPOUT) of the PWM comparator 534 is input to the skip mode controller 516.

Figure 6:
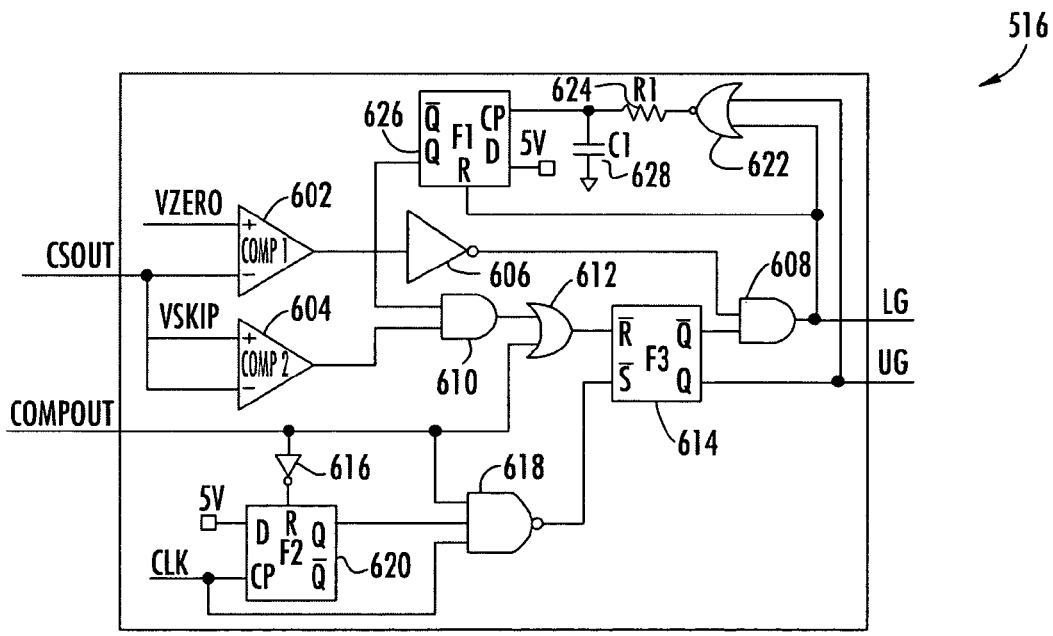
FIG. 6 is a schematic diagram of the skip mode controller.

Referring now to FIG. 6, there is illustrated the skip mode controller 516 of the present invention. The skip mode controller 516 receives the CSOUT signal from the current-sense amplifier 520 as one input signal and the COMPOUT signal from the PWM comparator 534 as another input signal. The CSOUT signal is provided to the negative inputs of a first comparator 602 and a second comparator 604. Comparator 602 detects if the converter 502 is operating in a discontinuous current mode (DCM) or a continuous current mode (CCM) of operation. This is done by comparing the CSOUT input with the zero voltage level signal (VZERO) applied to the positive input of comparator 602. The output of comparator 602 is applied to an inverter 606, and the output of invertor 606 is applied to one input of an AND gate 608. The output of the AND gate 608 comprises output LG which is used to turn on and turn off low side transistor 510.

Comparator 604 determines the pulse skipping current limit threshold for the regulator 502. This is accomplished by comparing CSOUT with the voltage signal VSKIP which is connected to the positive input of comparator 604. The output of comparator 604 is connected to one input of an AND gate 610. The output of AND gate 610 is connected to one input of OR gate 612 having an output connected to the R input of RS flip-flop 614. The other input of OR gate 612 is connected to the COMPOUT signal from the PWM converter 534. The COMPOUT signal is also applied to an invertor 616 and to one input of a NAND gate 618.

The output of invertor 616 is provided to the R input of D flip-flop 620. The D input of D flip-flop 620 is connected to a 5V reference voltage signal, and the CP input is connected to a clock signal. The clock signal is additionally connected to one input of NAND gate 618. The Q output of D flip-flop 620 is also connected to an input of NAND gate 618. The output of NAND gate 618 is connected to the S input of RS flip-flop 614. The Q output of RS flip-flop 614 is connected to the other input of AND gate 608. The Q output of RS flip-flop 614 provides output signal UG for turning on and off high side transistor 506.

Signals LG and UG are also provided to the inputs of a NOR gate 622. The output of NOR gate 622 connects to a resistor 624 connected to the CP input of D flip-flop 626. A capacitor 628 connects between the CP input of D flip-flop 626 and ground. The D input of the D flip-flop 626 is connected to a 5V reference voltage. The R input of D flip-flop 626 connects to LG output signal from AND gate 608, and the Q output of D flip-flop is connected to the other input of AND gate 610.

Figure 7:
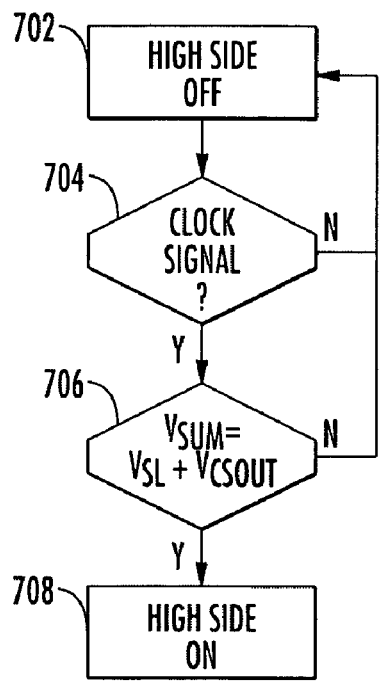
FIG. 7 is a flow diagram illustrating the process for turning on the high side transistor of the synchronous buck regulator.

The skip mode controller 516 in addition to minimizing conduction losses as will be described in one moment, reduces the switching frequency at light loads and thus the switching losses within the synchronous buck regulator 502. Within the pulse skipping circuit 516, the comparator 602 detects if the regulator 502 is operating in either a discontinuous current mode or continuous current mode. Additionally, comparator 604 is used to determine the pulse skipping current threshold for the regulator 502. The high side switch 506 is turned on when a clock signal pulse is received if the sum of the amplified current signal (CSOUT) and the slope compensation signal 536 is lower than the compensation signal VCOMP from the output of the error amplifier 532. This process is more fully illustrated in FIG. 7.

When the high side switch 506 is off at step 702, inquiry step 704 determines if a clock signal pulse has been received. If not, the high side switch 506 remains off at step 702. If inquiry step 704 detects a clock pulse, inquiry step 706 determines if the sum of the amplified current-sense signal from the current-sense amplifier 520 and the slope compensation signal 536 are lower than the compensation signal VCOMP from the error amplifier 532. If not, the high side switch remains turned off. However, if the sum is less than the VCOMP signal, the high side switch 506 is turned on at step 708. If inquiry step 706 determines that the sum of the amplified current-sense signal and the voltage compensation signal is higher than the compensation signal VCOMP, there is no high side switch 506 on time pulse until the next clock cycle is received. During this time period when no high side switch pulse is provided, the output capacitor 528 provides the load current during this pulse skipping period.

Figure 8:
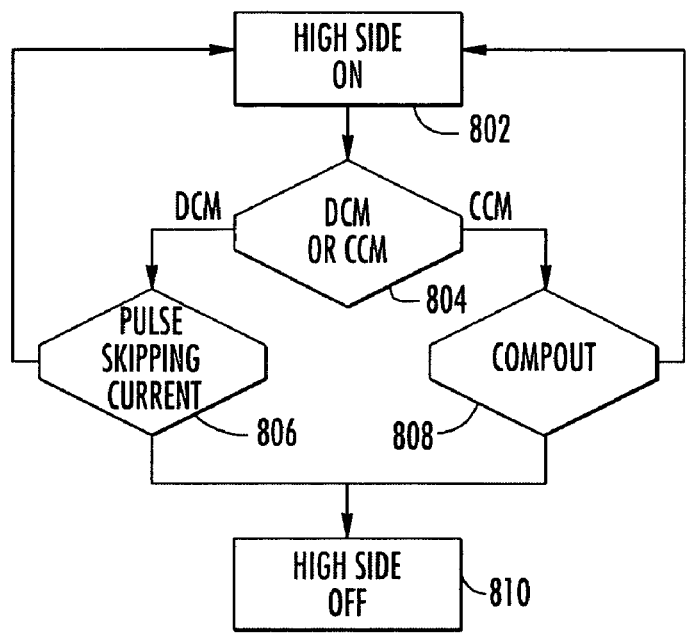
FIG. 8 is a flow diagram illustrating the process for turning off the high side transistor of the synchronous buck regulator.

Once the high side switch 506 has been turned on, there are two criteria for determining whether the high side switch 506 must be turned off as illustrated in FIG. 8. The high side switch 506 is initially on at 802. Inquiry step 804 determines whether the converter 502 is operating in the DCM or CCM mode. If inquiry step 804 determines that the converter 502 is operating in the DCM mode, inquiry step 806 uses the pulse skipping current (VSKIP/$R_{CS}$) to determine when to turn off the high side switch at step 810. If the regulator gets into DCM, the output of D flip-flop 626 toggles to logic high so that the Rbar input of D flip-flop 614 cannot toggle to logic low until CSOUT is higher than VSKIP. If inquiry step 804 determines that the high side transistor 506 is operating in the CCM mode, inquiry step 808 uses the value of COMPOUT to determine when to turn off the high side transistor at step 810. If the converter stays at CCM, the output of D flip-flop 626 stays at logic low so that the Rbar input of D-flip flop (614) is only determined by COMPOUT.

Figure 9:
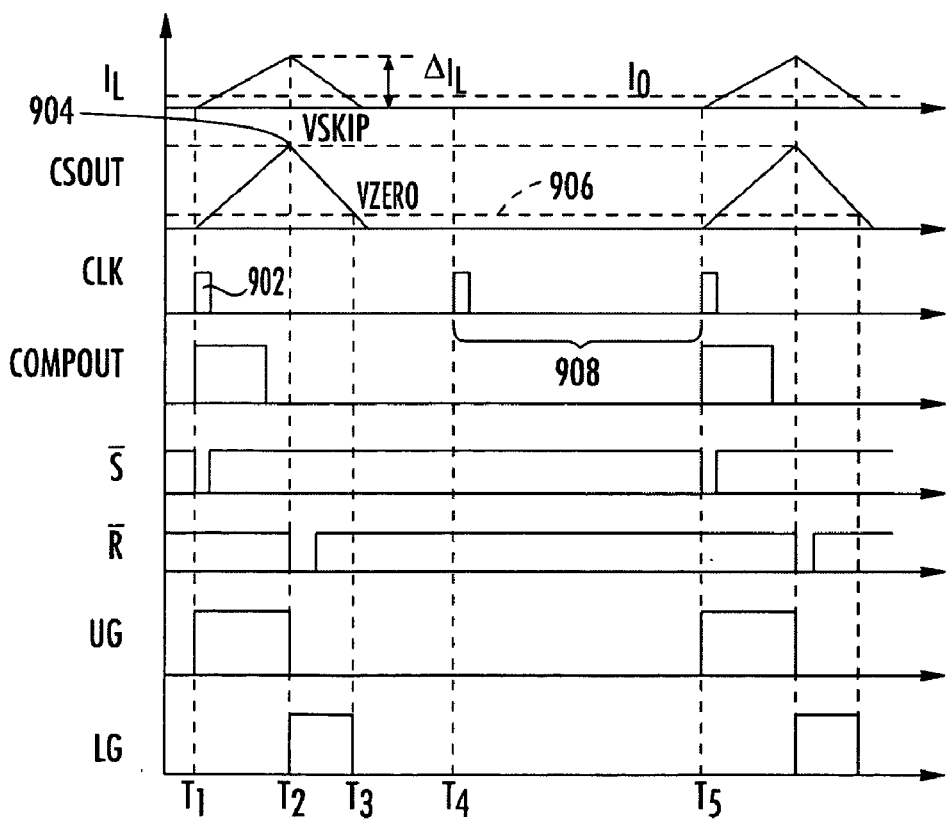
FIG. 9 is a timing diagram illustrating the operation of the synchronous buck regulator of FIG. 5.

Referring now to FIG. 9, there are illustrated the switching waveforms associated with the buck regulator 502 and skip mode controller 516. At time period T1, a clock pulse 902 is applied to the regulator 502 and signal UG goes high since the sum of the amplified current signal CSOUT and the slope compensation signal is lower than VCOMP and COMPOUT is high. This turns on the high side switch 506, and the inductor current $I_L$ begins increasing between T1 and T2.

The high side switch 506 is turned off when the inductor current $I_L$ reaches the skipping current limit threshold (VSKIP) 904 because the high side switch 506 is operating in DCM mode according to the output from D-type flip-flop F1 626. The high side switch 506 is turned off and low side switch 510 is turned on at T2 when the inductor current $I_L$ reaches the pulse skipping current limit 904.

When the inductor current $I_L$ is below the zero current limit threshold ($V_O$) 906 at T3, LG goes low and turns off the low side transistor 510. This reduces the conduction loss using diode emulation. Both the low side switch 510 and high side switch 506 remain turned off from time period T3 to T4. An additional clock pulse is received at T4. However, since the sum of the slope compensation signal and the amplified current-sense signal (CSOUT) are above the loop compensation voltage VCOMP, and COMPOUT remains low, signal UG remains low and the high side and low side switches remain off. This creates a pulse skip while the circuit waits for a next clock cycle. The output capacitor 528 provides the load current during the pulse skipping period 908 between T4 and T5. Use of the pulse skipping period 908 between T4 and T5 effectively reduces the switching frequency of the regulator 502 and results in reduced switching losses as well as the reduced conduction losses described above. The reduced switching and conduction losses improves operation of the regulator 502 in light load conditions.

Figure 10:
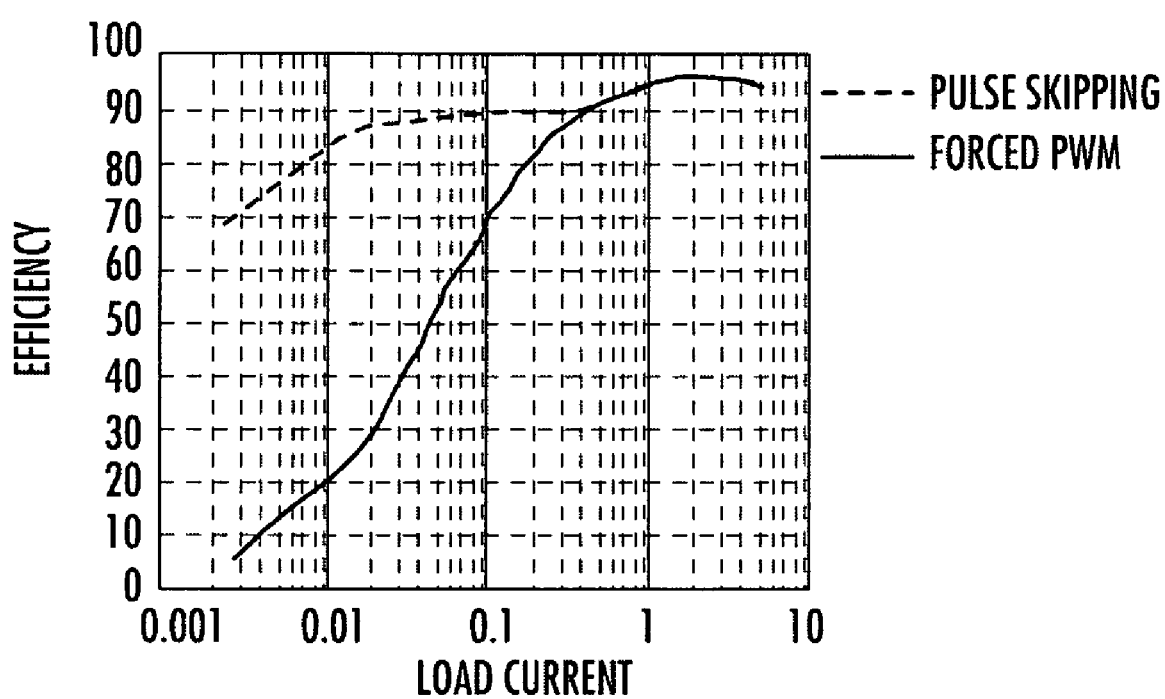
FIG. 10 is an illustration of the measured efficiencies of a regulator using the pulse skipping method of the present invention and regulator using a forced pulse width modulated approach.

Referring now to FIG. 10, there is illustrated a comparison of the measured efficiencies between a circuit operating in the pulse skipping mode of the circuit described with respect to FIG. 6, and a regulator operating in a forced pulse width PWM mode. As can be seen in FIG. 10, a circuit operating in pulse skipping mode can achieve over 80% efficiency at a 10 milliamp load current. A circuit using the forced PWM mode may only achieve 20% efficiency under this same load current. Thus, the pulse skipping PWM control scheme described with respect to FIGS. 5–9 can significantly improve the light load power conversion efficiency of a voltage regulator thus extending the battery life in portable power applications.

Although the preferred embodiment has been described in detail, it should be understood that various changes, substitutions and alterations can be made therein without departing from the spirit and scope of the invention as defined by the appended claims.

What is claimed is:

1. A voltage regulator, comprising:
   a voltage input for receiving an input voltage;
   circuitry for regulating the input voltage to provide an output voltage, said circuitry including at least a high side switch and a low side switch;
   a skip mode controller for controlling the high side switch and the low side switch to decrease conduction losses and switching losses within the voltage regulator;
   wherein when the high side switch is in an off state, the skip controller turns on the high side switch responsive to a clock signal pulse and when a sum of a current sense amplifier signal and a slope compensation signal are lower than a voltage feedback signal;
   wherein when the high side switch is in an on state, the skip controller turns off the high side switch responsive to either (1) the voltage regulator operating in a continuous current mode and the sum of the current sense amplifier signal and the slope compensation signal being higher than the voltage feedback signal or (2) the voltage regulator operating in a discontinuous current mode and an inductor current of the voltage regulator reaching a skipping current limit threshold;
   wherein when the low side switch is in an off state, the skip controller turns on the low side switch responsive to the voltage regulator operating in a discontinuous current mode and an inductor current of the voltage regulator reaching the skipping current limit threshold; and
   wherein when the low side switch is in an on state, the skip controller turns off the low side switch responsive to the inductor current dropping below a zero level.

2. The voltage regulator of claim 1, wherein the skip mode controller decreases the switching losses by decreasing the switching frequency of the high side switch and the low side switch by maintaining the high side switch and the low side switch in an off state responsive to the clock signal pulse and when the sum of the current sense amplifier signal and the slope compensation signal are greater than an integrated voltage feedback signal.

3. The voltage regulator of claim 2, wherein the skip mode controller decreases the conduction losses by turning off the low side switch responsive to the inductor current dropping below a zero level.

4. The voltage regulator of claim 1, wherein the circuitry generates an amplified current source signal and comparator output signal.

5. The voltage regulator of claim 1, wherein the skip mode controller provides a smooth transition between continuous current mode and discontinuous current mode.

6. A voltage regulator, comprising:
   a voltage input for receiving an input voltage;
   circuitry for regulating the input voltage to provide an output voltage, said circuitry including:
   a high side switch and a low side switch;
   an inductor for storing a charge responsive to operation of the high side switch and the low side switch;
   a current-sense amplifier for detecting a current through the inductor and for generating a current-sense amplifier signal;
   a PWM comparator for generating a comparator signal responsive to voltage feedback signal, a slope compensation signal and the current-sense signal;
   a skip mode controller for controlling the high side switch and the low side switch to decrease conduction losses and switching losses within the voltage regulator responsive to the current-sense signal and the comparator signal;
   wherein when the high side switch is in an off state, the skip controller turns on the high side switch responsive to a clock signal pulse and when a sum of the current sense amplifier signal and the slope compensation signal are lower than the voltage feedback signal;
   wherein when the high side switch is in an on state, the skip controller turns off the high side switch responsive to either (1) the voltage regulator operating in a continuous current mode and the sum of the current sense amplifier signal and the slope compensation signal being higher than the voltage feedback signal or (2) the voltage regulator operating in a discontinuous current mode and an inductor current of the inductor reaching a skipping current limit threshold;
   wherein when the low side switch is in an off state, the skip controller turns on the low side switch responsive to the voltage regulator operating in a discontinuous current mode and an inductor current of the inductor reaching the skipping current limit threshold; and
   wherein when the low side switch is in an on state, the skip controller turns off the low side switch responsive to the inductor current dropping below a zero level.

7. The voltage regulator of claim 6, wherein the skip mode controller decreases the switching losses by decreasing the switching frequency of the high side switch and the low side switch signal pulse and when a sum of a current sense amplifier signal and a slope compensation signal are lower than an integrated voltage feedback signal.

8. The voltage regulator of claim 6, wherein the skip mode controller decreases the conduction losses by turning off the low side switch responsive to the inductor current dropping below a zero level.

9. The voltage regulator of claim 6, wherein the skip mode controller provides a smooth transition between continuous current mode and discontinuous current mode.

10. A method for operating a high side switch and a low side switch of a voltage regulator, comprising the steps of:
    turning on the high side switch when the high side switch is in an off state responsive to a clock signal pulse and when a sum of a current sense amplifier signal and a slope compensation signal are lower than a voltage feedback signal;
    turning off the high side switch when the high side switch is in an on state responsive to either (1) the voltage regulator operating in a continuous current mode and the sum of the current sense amplifier signal and the slope compensation signal being higher than the voltage feedback signal or (2) the voltage regulator operating in a discontinuous current mode and an inductor current of the voltage regulator reaching a skipping current limit threshold;
    turning on the low side switch when the low side switch is in an off state responsive to the voltage regulator operating in a discontinuous current mode and an inductor current of the voltage regulator reaching the skipping current limit threshold; and
    turning off the low side switch when the low side switch is in an on state responsive to the inductor current dropping below a zero level.

11. The method of claim 10, further including the step of maintaining the high side switch and the low side switch in an off state responsive to the clock signal pulse and when the sum of the current sense amplifier signal and the slope compensation signal are greater than an integrated voltage feedback signal to decrease the switching losses by decreasing the switching frequency of the high side switch and the low side switch.

12. The method of claim 10, wherein the step of by turning off the low side switch responsive to the inductor current dropping below a zero level decreases the conduction losses of the voltage regulator.

13. The voltage regulator of claim 10, further comprising the step of providing a smooth transition between continuous current mode and discontinuous current mode.

* * * * *